Dec. 14, 1943.     R. SARDESON     2,336,640
FOOD COOKING DEVICE
Filed April 15, 1941     3 Sheets-Sheet 2
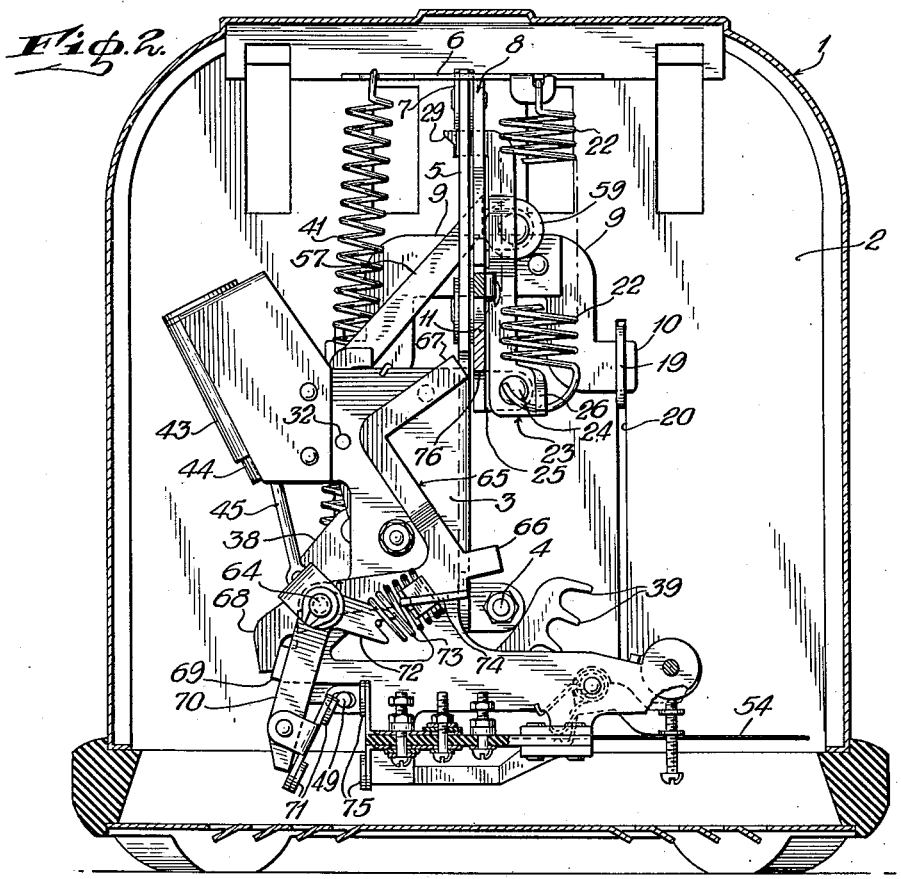
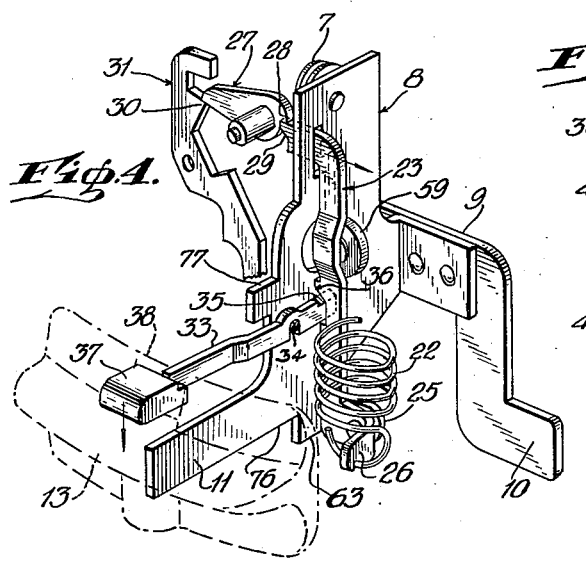
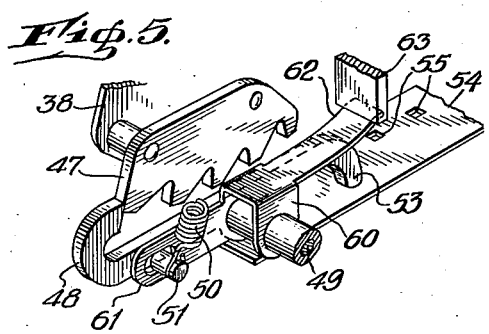
INVENTOR
Robert Sardeson
BY
Reginald Hicks
ATTORNEY

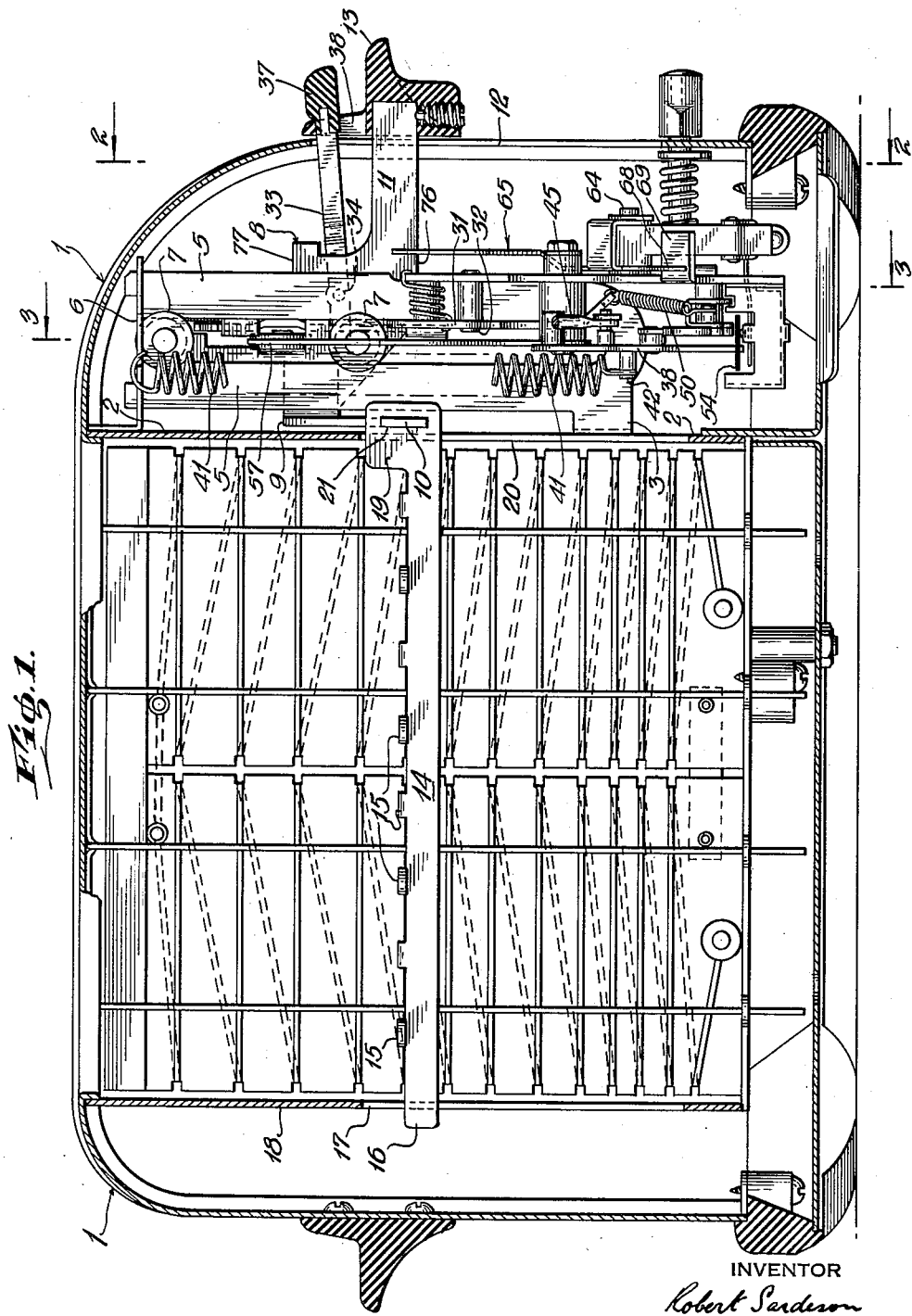

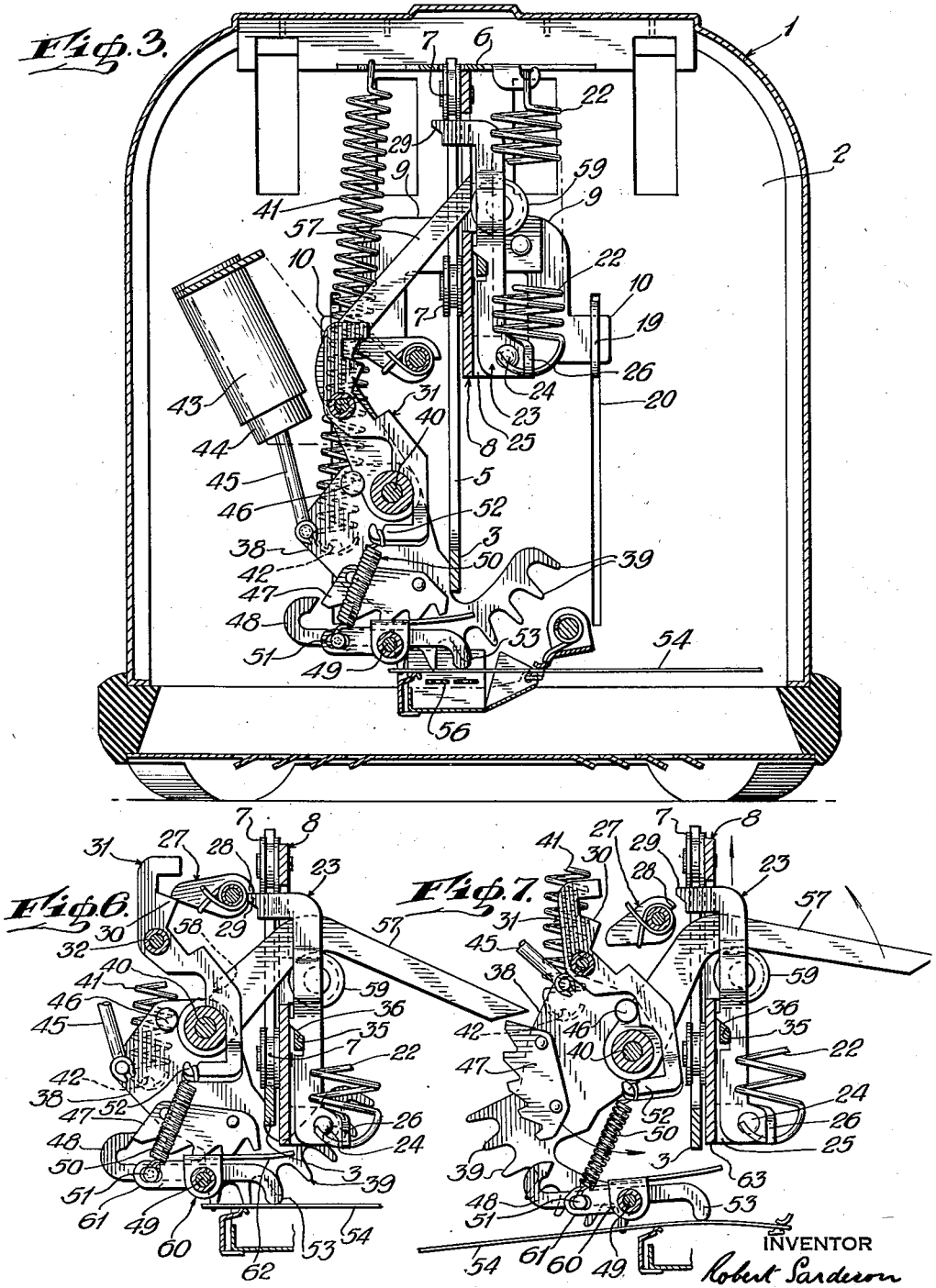

Patented Dec. 14, 1943

2,336,640

UNITED STATES PATENT OFFICE 2,336,640

FOOD COOKING DEVICE

Robert Sardeson, Minneapolis, Minn., assignor to Harold C. Genter, Miami Beach, Fla.

Application April 15, 1941, Serial No. 388,593

13 Claims. (Cl. 99—329)

This invention relates to food cooking devices, such as electric toasters, and has for its general object the improvement of such devices as exemplified in my pending application Serial No. 289,905, filed August 12, 1939. In that application there is illustrated and described a toaster of the automatic or so-called "pop-up" type in which vertically movable bread racks are manually moved from an elevated, idle position into a lower, active position in which bread slices carried by the racks are in toasting relation to heating elements which are energized coincidently with the movement of the bread racks, and in which the racks are spring-returned to their elevated position and the heating elements de-energized upon the release of appropriate latch mechanism by means of a thermally responsive control itself set into action, and de-energized, respectively, coincidently with the downward and upward movements of the bread racks.

One of the objects of this invention is the improvement of the manually-operated means for controlling the device, to the end of affording better control thereby over the automatic elements and their operation; a further object is to render the manually-operated means more certain in action with the less regard for the care or otherwise with which the device is manipulated; and still another object is to provide for the convenient and ready termination of the automatic operation of the device at any time without regard to the position of the automatic elements and with a minimum of wear and tear on the parts.

Another object of the invention is to improve and simplify the physical connection between the manually-operated means and the bread racks, to the end of providing a more effective and at the same time less expensive construction than heretofore.

Other objects and features of the invention will be more readily understood from the following description and the accompanying drawings.

While of advantage in other relations the invention is particularly useful in connection with, and is therefore illustrated as applied to, the toaster structure of the said application; and only so much of the latter is described herein as is necessary to an understanding of the present invention.

In the accompanying drawings, which illustrate the preferred construction, Fig. 1 is a vertical section of a toaster having the invention applied; Figs. 2 and 3 are sections on the lines 2—2 and 3—3, respectively, of Fig. 1; Figs. 4 and 5 are large scale perspective views to show details and Figs. 6 and 7 are views of portions of the control mechanism in different stages of operation.

As shown in Fig. 1, the over-all housing of the toaster, generally designated 1, is divided into two compartments by a vertical wall 2, the larger compartment containing suitable heating elements and constituting the oven portion of the device, and the smaller compartment containing the control mechanism.

The control mechanism is supported on a sheet metal frame 3 secured at its lower end to wall 2 by bolt 4 (Fig. 2) and having upstanding, spaced track bars 5 the upper ends of which are located in slots in a bracket 6 also secured to wall 2. Flanged rollers 7 engaging the edges of track bars 5 are mounted upon and serve to guide the upward and downward movements of a carriage, shown particularly in Fig. 4, consisting of a plate generally designated 8 to which is riveted an oven or bread rack support 9 having laterally projecting ears 10. The lower part of plate 8, in the form of an actuating arm 11, extends out through a slot 12 in the toaster housing and on its outer end carries a handle 13 by which the carriage is manually moved from its upper, idle position into its lower, toasting position.

The bread slices are supported in the oven by means of racks 14 consisting of sheet metal strips having laterally and alternately oppositely bent ears 15, the ends 16 of the racks passing through and being guided in slots 17 in an auxiliary wall 18, and the enlarged ends 19 of the racks passing through and guided in slots 20 in wall 2. As will be apparent, the use of strip stock for the racks, mounted edgewise, i. e. with its major cross-sectional dimension vertical, reduces to a minimum the size of the slots required to be made in wall 2; and, while ensuring effective guiding for the racks as they are lowered and raised, the construction is such as to minimize the likelihood of such quantities of crumbs passing from the oven into the control compartment as would interfere with the operation of the mechanism contained therein.

Heretofore some difficulty has been experienced in securing such a connection between the bread racks and their supporting carriage as will ensure smooth and trouble-free operation within the unavoidable manufacturing and assembly tolerances, but no such troubles are experienced with the present construction. Instead of the usual rigid connection between the racks and the carriage, a floating rack mounting is provided, achieved by seating the supporting ears 10 in slots 21 (Fig. 1) in the enlarged, flat ends 19 of the racks, the slots fitting the ears sufficiently closely (and, if deemed necessary, cut slightly out of the vertical) to prevent the racks from sagging substantially out of the horizontal, but nevertheless providing a sliding fit on the ears. This arrangement not only reduces assembly costs and difficulties but also, since the racks are free to move laterally in relation to the supporting ears, permits the racks to ride in their guide slots 20 without binding even if the carriage movement, for any reason, is not precisely parallel to the guide slots 20.

The carriage 8 is normally held in, and as below described is restored to, its upper, idle position by a spring 22 (for convenience termed the carriage spring) the upper end of which is anchored on bracket 6 and the lower end of which is anchored to the carriage. In this preferred construction a latch member generally designated 23 (for convenience termed the carriage latch) is pivotally mounted at 24 on a laterally projecting ear 25 of the carriage, and itself has a forwardly projecting ear 26 to which the lower end of carriage spring 22 is anchored. The latter thus serves normally to hold the carriage in its elevated position (Figs. 1, 2 and 3) and at the same time resiliently to hold carriage latch 23 in the position shown.

The handle 13 is moved down to lower the bread racks into toasting position and coincidently cause the heating elements to be energized, as will be understood; and while in the usual course the carriage is latched in this position and released automatically upon the termination of the toasting period, special provision is made to permit the carriage to be manually released and restored to its idle position independently of the functioning of the automatic control. The manual release is adaptable to a variety of constructions but for convenience is shown in conjunction with the type of automatic control shown in the said pending application, being of particular advantage in that connection. In the present instance the means for holding the carriage in its lower, toasting position, shown in Figs. 4 and 6, comprises an intermediate pivoted latch 27 having at one end a shoulder 28 adapted to overlie the toe 29 of carriage latch 23 and, at its other end, adapted to seat on the shoulder 30 of a third or main latch 31 which is pivotally mounted at 32 (Figs. 2 and 6) on the frame 3. As long as the latches occupy the position shown, the carriage is held against upward movement under the influence of its spring 22.

The manual release for the carriage comprises a member mounted on and with freedom for limited movement with respect to the carriage, such as a lever 33 pivotally mounted on the carriage at 34, the inner end of the lever passing through a cut out in the carriage latch 23 and having a beveled surface 35 engaging a similar surface 36 at the top of the said latch cut out; so that when the inner end of release lever 33 is raised the interaction of the surfaces 35, 36 moves the carriage latch 23 to the right (Fig. 6) about its pivot 24 and disengages the toe 29 of the latch from shoulder 28 of the intermediate latch 27, freeing the carriage for upward movement under the influence of its spring 22.

As shown in Fig. 1, the outer end of release lever 33 is arranged to project out of the toaster housing through the same slot 12 through which projects the carriage handle arm 11, so that no additional opening in the housing is required to render the release lever accessible from outside the housing. In this form the release lever is also located in close proximity to and just above the handle arm 11 so that a fingerpiece 37 mounted on the outer end of release lever 33 can be located just above the handle 13. As shown, the fingerpiece seats in a recess 38 formed in the center of the handle. The construction is thus such that the carriage is released from its lower, latched position by simply pressing downwardly on fingerpiece 37.

The carriage spring is necessarily relatively strong and any such release as that described is necessarily quick acting, with the result that, unless the upward movement of the carriage is restrained or cushioned, the impact of the engagement of the carriage with bracket 6 is apt to be noisy and also sufficiently violent as to subject the parts to undesirable strains; but when the main and release handles are located so that they may be engaged simultaneous by one hand, the operator can readily cushion the shock of the upward movement of the carriage. In the preferred form illustrated, the fingers of the operator are of necessity substantially in contact with or at least in the path of movement of handle 13 as the fingerpiece 37 is depressed, so that they serve, without premeditation by the operator, to cushion the upward movement of the released carriage.

As will be understood, the function of the automatic control mechanism is to move the upper end of main latch 31 to the left (as viewed in Fig. 6) at the conclusion of successive toasting periods, so that, as shown in Fig. 7 (which illustrates the position of the parts at the instant of release) the shoulder 30 is drawn from under the end of intermediate latch 27, permitting the latter to be moved about its pivot by the upward thrust of toe 29 of carriage latch 23 under the influence of carriage spring 22 and the carriage thereby freed to return to its upper, idle position. In brief, this control mechanism, which is the subject of and is described in detail in the said application, is constructed and operates as follows:

A pinion, consisting of a plate 38 having a sector extension provided with teeth 39 is mounted for pivotal movement about a stud 40 secured to the mechanism frame 3, the pinion being biased to rotate in a clockwise direction by a spring 41 of which the upper end is attached to bracket 6 and the lower end to a stud 42 projecting from the pinion 38. Movement of the pinion about its pivot is cushioned by a dash pot 43 and piston 44, the latter connected to the pinion by rod 45. As shown in Figs. 6 and 7, a stud 46 projecting from the face of the pinion is so positioned as to engage and actuate main latch 31, as above described and as shown in Fig. 7, as the pinion approaches the limit of its clockwise movement.

Mounted on and spaced from the pinion is a ratchet 47 and, below it, a pawl 48 which is pivotally mounted on stud 49 also carried by the mechanism frame 3. A spring 50, attached at one end to a stud 51 projecting from the pawl and at its other end to the tailpiece 52 of main latch 31 serves to yieldingly hold both the latch and the pawl in the positions shown in Fig. 6. The tail 53 of pawl 48 rests upon an endwise movable strip 54 of bi-metal having perforations 55 (Fig. 5) spaced to receive the tips of pinion teeth 39. The latter, under the influence of spring 41, tend to advance the bi-metal strip toward the left from the position shown in Fig. 6 but are restrained by the engagement of pawl 48 with ratchet 47.

Directly beneath that portion of the bi-metal strip upon which the tail 53 of pawl 48 rests there is located a suitable heater 56, diagrammatically indicated in Fig. 3, the heat of which produces a more or less localized upward deflection of the adjacent portion of the bi-metal. This deflection, raising the tail 53 of pawl 48 and disengaging the pawl from the first (left hand) tooth of ratchet 47, permits spring 41 to rotate pinion 38 and the teeth 39 of the latter to advance the bi-metal until the adjacent relatively flat, unheated portion thereof lowers the pawl tailpiece 53 and engages the pawl with the second tooth of ratchet 47. This movement of the bi-metal, resulting from the heating of successive portions of it, continues until, when the pawl has been disengaged from the last ratchet tooth, pinion 38 is rotated by spring 41 to the position of Fig. 7 in which stud 46 releases the carriage latch mechanism as above described.

Pivotally mounted on stud 40 about which pinion 38 rotates is a boomerang-shaped reset cam 57 having a recess 58 (Fig. 6) in which the main latch actuating stud 46 is adapted to seat when pinion 38 is at the limit of its clockwise movement. The lower edge or cam surface of the reset cam 57 rides on a roller 59 mounted on the carriage, so that as the latter is restored to its upper, idle position under the influence of spring 22 (continuing from the position indicated in Fig. 7) roller 59 rotates the reset cam in a counter-clockwise direction about its pivot; and, by its engagement with stud 46, the cam in turn similarly rotates pinion 38 and restores it and its associated elements to the position shown in Fig. 3. As will be understood, carriage spring 22 is more powerful than spring 41 and the latter is, of necessity, tensioned in readiness for the next operation by the described counter-clockwise, resetting movement of pinion 38.

Referring particularly to Fig. 6, it will be seen that on the downward, manually effected movement of the carriage the toe 29 of carriage latch 23 snaps under the shoulder 28 of intermediate latch 27 just before the lower roller 7 reaches that portion of frame 3 which unites the lower ends of track bars 5. Further depression of the carriage by handle 13 will cause roller 7 to engage the stated portion of frame 3, which serves as a stop. By a heavy handed, too vigorous depression of the handle and engagement of roller and stop, it is possible in extreme cases so to jar the whole toaster as to cause pawl 48 to jump free of ratchet 47, and to the end of making the device as foolproof as possible provision is made against that contingency. Such provision consists of a special lock, normally inactive but becoming effective at or about the lower limit of travel of the carriage to prevent disengagement of any part of the latch mechanism and particularly, in this instance, of the pawl and ratchet.

As shown particularly in Figs. 5, 6 and 7 there is provided an interlock member generally designated 60, pivotally mounted alongside pawl 48 on stud 49, with an extension 61 apertured to loosely embrace stud 51 and a spring tailpiece 62 extending into the path of the lower end 63 of carriage 8. As above stated, when the carriage is manually depressed in the ordinary manner it reaches its latching position (Fig. 6) before reaching the end of its stroke. However, if the carriage is slammed down in such a way as to carry it to the limit of its movement, the interlock comes into play. As will be seen, the lower end 63 of the carriage then strikes the tailpiece 62 of the interlock member and the extension 61 of the interlock exerts an upward thrust on stud 51 and thereby holds pawl 48 against jumping out of engagement with ratchet 47. As soon as pressure on handle 13 is released, spring 22 raises the carriage slightly to the position shown in Fig. 6, disengaging the carriage from the interlock member and leaving pawl 48 free to operate in the manner already described.

The circuit wiring, being conventional, is not illustrated. It requires simply that the oven-heating elements and the bi-metal heater 56 be incorporated in a circuit capable of being energized and de-energized, respectively, coincidently with the downward and upward movements of the carriage, preferably under the control of a suitable toggle or snap-action switch, to avoid contact arcing. A preferred form of switch actuating mechanism especially suited to control such a circuit is illustrated in Fig. 2.

Pivotally mounted on a stud 64 on frame 3 is a switch actuator, generally designated 65, having a short, lower arm 66, a longer, upper arm 67, and a stop portion 68 on the other side of its pivot to engage the adjacent ear 69 of frame 3 to limit the counter-clockwise movement of the actuator. Pivotally mounted on the same stud 64 is an inverted L-shaped switch member, of Bakelite or other insulating material, the arm 70 of which, in the illustrated open position of the switch, backs against the same stop ear 69 of the frame and at its lower end carries a pair of loosely mounted bridging contacts 71. The other arm 72 of the switch member is engaged by a toggle spring 73 seated on the ear 74 of actuator 65. As will be understood, clockwise movement of the actuator carries the toggle spring across a dead center position so that it then snaps arm 72 of the switch member upwards and brings contacts 71 into bridging relation to fixed contacts 75 to complete the said circuit. The locations of the arms 66 and 67 of the actuator are such that they are engaged, respectively, on the downward and upward movements of the carriage to close and open the switch. When handle 13 is moved downward the lower edge 76 of handle arm 11 strikes the upper edge of actuator arm 66 to rotate it clockwise and close the switch in the manner described. On the upward movement of the carriage, whether manually or automatically released, the upper edge 77 of the carriage (Figs. 1 and 4) strikes the lower edge of actuator arm 67 to rotate it counter-clockwise and open the switch.

The following is claimed:

1. In a food cooking device, the combination with a housing, having a slot therein, of two manually operable members projecting through the said slot, and means within the housing responsive to manual operation of one of said members to effect movement of the other member.

2. In a food cooking device, the combination with a housing, having a slot therein, of two manually operable members projecting through the said slot, handles on said members located for simultaneous engagement by one hand, and means within the housing responsive to manual operation of one of said members to effect movement of the other member.

3. In a food cooking device, the combination with a housing, having a slot therein, of two members within the housing mounted one upon the other and each projecting through said slot for external manual operation, and means within the housing responsive to manual operation of one of said members to effect movement of the other member.

4. In a food cooking device of the kind including a housing, a movable food support therein and manually operable control means therefor extending out through a slot in said housing: an auxiliary externally accessible control member for said support, such control member being mounted for movement with and for limited movement with respect to the first control means.

5. In a food cooking device of the kind including a housing, a movable food support therein and manually operable control means therefor extending out through a slot in said housing: an auxiliary externally accessible control member for said support, such control member being pivotally mounted on said control means.

6. In a food cooking device of the kind including a movable food support, manually operable control means therefor movable from an upper, idle position to a lower, active position, a spring for raising said support and control means, and a latch for restraining the action of said spring: a latch release member mounted for movement with said control means and also relatively thereto to release said latch.

7. In a food cooking device of the kind adapted for manual setting to initiate a cooking period and automatic control to terminate such period, including a control handle mounted for manual movement from an upper, idle position to a lower, active position, a spring adapted to restore said handle to its upper position, and a latch for restraining the action of said spring: an auxiliary handle mounted above and in the path of movement of said control handle, and latch release means adapted for actuation by said auxiliary handle.

8. In a food cooking device of the kind adapted for manual setting to initiate a cooking period and automatic control to terminate such period, including a control handle mounted for manual movement from an upper, idle position to a lower, active position, a spring adapted to restore said handle to its upper position and a latch for restraining the action of said spring: an auxiliary handle mounted adjacent and in the line of movement of said control member and latch release means adapted for actuation by said auxiliary handle upon movement thereof toward said control handle.

9. In a food cooking device of the kind adapted for manual setting to initiate a cooking period and automatic control to terminate such period, including a control handle mounted for manual movement from an upper, idle position to a lower, active position, a spring adapted to restore said handle to its upper position and a latch for restraining the action of said spring: an auxiliary handle mounted immediately adjacent the control handle and movable both with and relatively to the same, and latch release means adapted for actuation by said auxiliary handle.

10. In a food cooking device of the kind adapted for manual setting to initiate a cooking period and automatic control to terminate such period, including a control handle mounted for manual movement from an upper, idle position to a lower, active position, a spring adapted to restore said handle to its upper position, and latch means for restraining the action of said spring: an interlock mechanism for blocking the release of said latch means, said mechanism located for actuation by the control handle adjacent the lower end of its path of movement.

11. The construction claimed in claim 10 in which the latch means includes a ratchet and a pawl, and in which said interlock mechansm includes a member associated with said pawl for actuation by the control handle to hold the pawl in engagement with the said ratchet.

12. An automatic toaster of the kind including a housing, a wall dividing the same into an oven compartment and a control compartment, said wall having a narrow vertical slot therein: characterized by the provision of a bread rack in the oven compartment having a flat end protruding through said slot into the control compartment, said flat end having a substantially vertical slot therethrough, a support for the rack in such compartment including a portion extending through and substantially fitting the slot in the end of the bread rack to support the same with freedom for relative movement between the support and the rack laterally of the slot in said wall.

13. An automatic toaster of the kind including a housing, a wall dividing the same into an oven compartment and a control compartment, said wall having a narrow vertical slot therein: characterized by the provision of a bread rack in the oven compartment having an end portion protruding through said slot into the control compartment, movable means in such compartment having a rack supporting portion, one of said portions being slotted to receive the other with freedom for relative movement between them laterally of the slot in said wall.

ROBERT SARDESON.